United States Patent [19]

Hopkins et al.

[11] 4,327,243

[45] Apr. 27, 1982

[54] GAS INSULATED TRANSMISSION LINE WITH ADHESIVE PARTICLE TRAP CARRIER

[75] Inventors: Melvyn D. Hopkins, North Grafton, Mass.; Philip C. Bolin, Wilkins, Pa.

[73] Assignee: Westinghouse Electric Corp., Pittsburgh, Pa.

[21] Appl. No.: 222,115

[22] Filed: Jan. 2, 1981

[51] Int. Cl.$^3$ .......................... H01B 9/06; H01B 9/04; H02G 5/06

[52] U.S. Cl. .................................... 174/14 R; 174/28

[58] Field of Search .................... 174/14 R, 16 B, 27, 174/28, 29, 99 R, 99 B; 307/147; 361/233; 134/1, 4, 42

[56] References Cited

U.S. PATENT DOCUMENTS

| | | | |
|---|---|---|---|
| 3,553,410 | 1/1971 | Morva | 174/14 R X |
| 4,084,064 | 4/1978 | Bowman | 174/14 R |
| 4,105,859 | 8/1978 | Cookson et al. | 174/14 R |

FOREIGN PATENT DOCUMENTS 2422961 10/1975 Fed. Rep. of Germany .... 174/14 R

*Primary Examiner*—Laramie E. Askin
*Attorney, Agent, or Firm*—M. S. Yatsko

[57] ABSTRACT

A gas insulated transmission line includes an inner conductor disposed within an outer sheath, with an insulating gas providing electrical insulation and insulating supports holding the inner conductor within the outer sheath. A particle trapping ring is disposed within but spaced apart from the outer sheath, and a flexible insulating sheet is secured to the particle trapping ring. The insulating sheet has an adhesive coating disposed thereon facing the ring, and the insulating sheet is positioned on the interior surface of the outer sheath. An insulating leaf spring, preformed along the radius of curvature of the outer sheath, is secured to the ring and is positioned between the insulating sheet and the ring, with the leaf spring loading the insulating sheet against the outer sheath. A stiffener spring is also secured to the ring and is disposed intermediate the ring and the leaf spring. The stiffener spring preloads the leaf spring and the insulating sheet outwardly away from the ring and towards the outer sheath.

12 Claims, 4 Drawing Figures

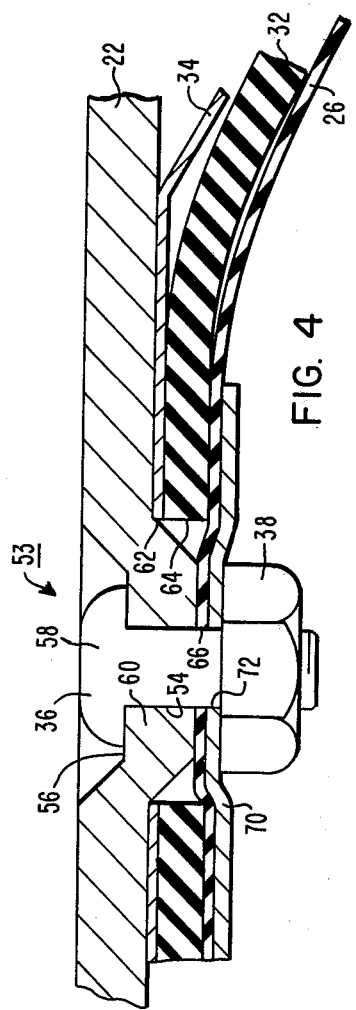
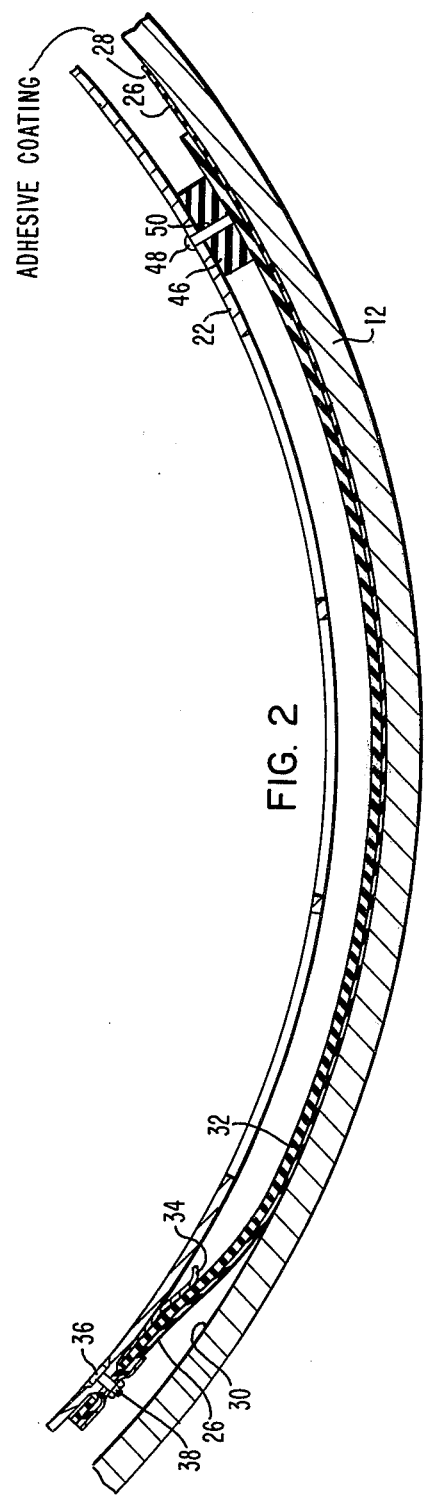

४,३२७,२४३

GAS INSULATED TRANSMISSION LINE WITH ADHESIVE PARTICLE TRAP CARRIER

BACKGROUND OF THE INVENTION

This invention relates generally to gas insulated electrical apparatus, and more particularly to a gas insulated transmission line having an adhesive particle trap movable with and carried by the electrostatic particle trap therein.

Gas insulated transmission lines are being used on an ever-increasing scale due to their reliability, compactness, and their ability to transmit large blocks of electrical energy economically. A typical gas insulated transmission line comprises an outer sheath of a good electrically conducting material such as aluminum, and an inner conductor disposed within the outer sheath also of a good electrical conducting material. A pressurized insulating gas, typical of which is sulfur hexafluoride at a pressure of, for example, fifty pounds per square inch gauge is utilized within the outer sheath to electrically insulate the inner conductor from the outer sheath. Insulating supports are utilized at spaced intervals along the length of the transmission line to insulatably support the inner conductor from the outer sheath. The outer sheath is typically at ground electrical potential, and the inner conductor is at high potential, typically at voltages such as 121-1200 kV phase voltage.

One of the problems which must be considered in the design of gas insulated transmission lines is the mobile conducting or semiconducting contamination particle. These particles may be present within the interior of the outer sheath and can lower the breakdown voltage of the insulating gas and possibly cause breakdown or flashover of either the gas or along the insulating supports. One means utilized in the prior art to deactivate and eliminate the deleterious effects of these contamination particles is the particle trap as described in the patent to Trump, U.S. Pat. No. 3,515,939. As illustrated in this patent, a low field region is intentionally created within the interior of the outer sheath, and contamination particles present within the outer sheath migrate to these low field regions, where the electrostatic forces exerted upon the contamination particles are reduced so that the contamination particles can no longer traverse within the interior of the transmission line.

Although the low-field particle trap has proven extremely useful in minimizing the effects of the contamination particles, certain conditions render these particle traps less effective than otherwise would be desired. For example, if the transmission line is installed on a slope, mechanical vibration on the transmission line may cause the particle previously trapped in the low field region to move away from the trap and out into the higher field areas of the system where they may cause problems. Further, if the electrostatic particle trap is movable with the support insulator which it typically protects, movement of the support insulator due to, for example, thermal expansion may cause movement of the low field region itself, thereby exposing the contamination particles previously trapped therein to be exposed to the higher fields existing outside of the trapping region.

One means which has been suggested to overcome this drawback has been to include an adhesive-coated insulating sheet in the transmission line which is attached and movable with the particle trap, so that the particle trapping region includes not only a low field region, but also an adhesive material in the low field region which also will capture contamination particles. By attaching the adhesive-coated insulating sheet to the particle trap itself, the adhesive will then be moved with the particle trap and the low field region, thus insuring that captured particles will remain in the low field regions at all times. However, what is particularly required with this type of system is some means for attaching the adhesive-coated insulating sheet to the particle trapping ring itself.

SUMMARY OF THE INVENTION

The above described need of the prior art is supplied by this invention which provides a gas insulated transmission line including a cylindrical outer sheath, an inner conductor disposed within the outer sheath, an insulating support supporting the inner conductor within the outer sheath, and a cylindrical, apertured particle trapping ring disposed within and spaced-apart from the outer sheath. A circumferentially extending flexible insulating sheet is secured to the particle trapping ring and is disposed on the interior surface of the outer sheath. The sheet has an adhesive coating disposed thereon facing the particle trapping ring. A circumferentially-extending insulating leaf spring, which is preformed along the radius of curvature of the outer sheath, is secured to the ring. The leaf spring is disposed between the insulating sheet and the ring with the leaf spring contacting and loading the insulating sheet to hold it on the interior surface of the outer sheath. A stiffener spring is secured to the particle trapping ring between the ring and the leaf spring, with the stiffener spring preloading the leaf spring and the insulating sheet outwardly away from the particle trapping ring and towards the outer sheath.

BRIEF DESCRIPTION OF THE DRAWINGS

Reference is now made to the description of the preferred embodiment, illustrated in the accompanying drawings, in which:

FIG. 2 is a detailed sectional view taken along line II—II of FIG. 1 showing the particle trapping system;

FIG. 4 is a detailed sectional view illustrating the connection to the particle trapping ring.

DESCRIPTION OF THE PREFERRED EMBODIMENT

Figure 1:
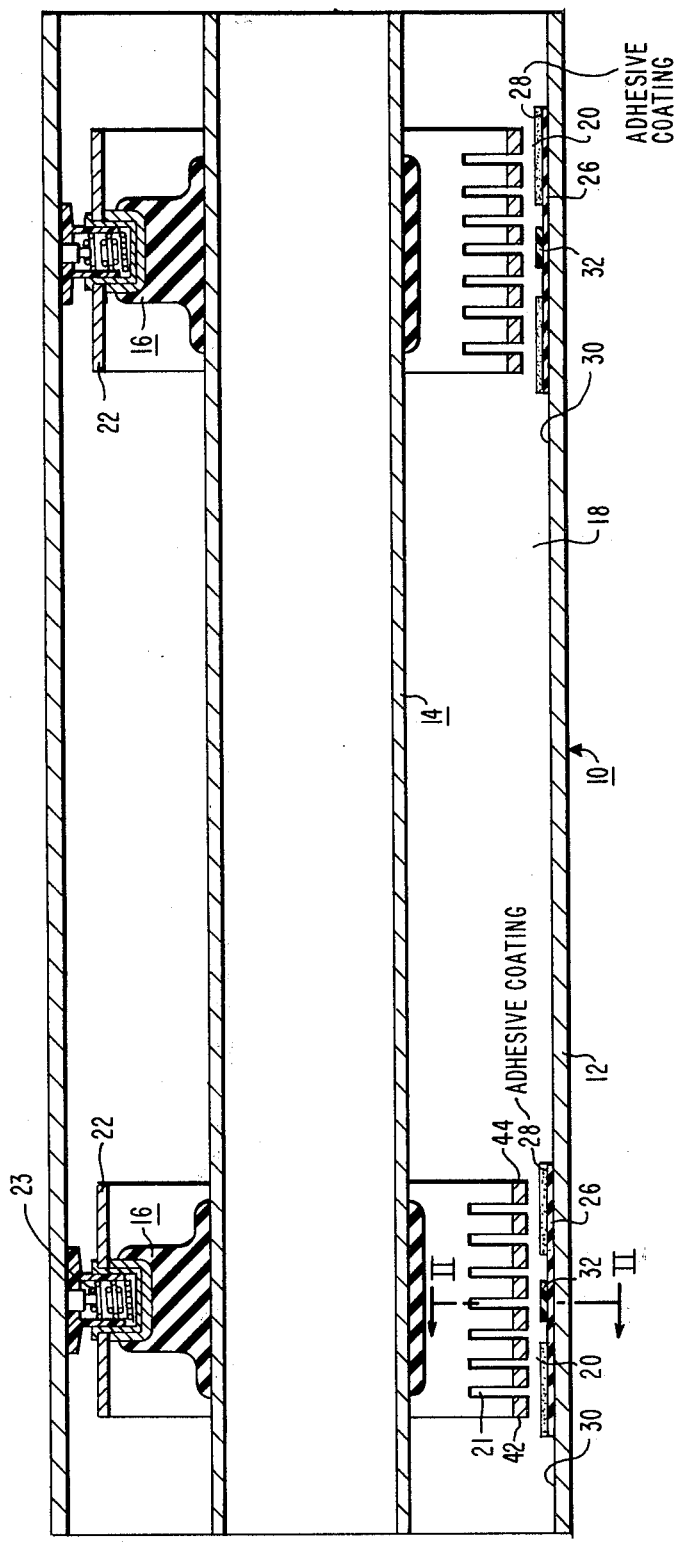
FIG. 1 is a longitudinal sectional view of a gas insulating transmission line utilizing the teachings of this invention.

Referring now more particularly to FIG. 1, therein is illustrated a gas insulating transmission line 10 utilizing the teachings of this invention. The transmission line 10 is comprised of an elongated, cylindrical outer sheath 12 at low or ground potential, with an inner conductor 14 disposed within the outer sheath 12. The inner conductor 14 and the outer sheath 12 would both be of a good electrically conducting material such as aluminum. A pressurized insulating gas 18 such as sulfur hexafluoride is disposed within the outer sheath 12 and functions to electrically insulate the inner conductor 14 from the outer sheath 12. A plurality of spaced insulating supports 16 are utilized for insulatably supporting the inner conductor 14 within the outer sheath 12.

Disposed about, connected to, and movable with each insulating support 16 is a cylindrical particle trapping ring 22 having a plurality of spaced apertures 21 therein. The metallic particle trapping ring 22 would be at the same electric potential as the outer sheath 12, and would be electrically connected thereto by means such as the contact button 23. A more detailed description of the electrical connection between the particle trapping ring 22 and the outer sheath 12 may be found in U.S. Pat. No. 4,084,064.

Because the ring 22 and the outer sheath 12 are at the same electric potential, a low field region 20 is formed therebetween. Contamination particles (not shown) which may be present within the transmission line 10 tend to migrate along the transmission line 10 and to be captured in the low field region 20, where the lack of significant electrostatic force prevents the contamination particles from escaping from the low field region 20 to cause problems within the transmission line 10.

To aid in capturing the contamination particles within the low field region 20, an insulating sheet 26 having an adhesive coating 28 thereon is disposed on the interior surface 30 of the outer sheath 12 opposite the particle trapping ring 22, thereby disposing it within the low field region 20. As can be seen in greater detail in FIG. 2, the insulating sheet 26 is flexible and circumferentially extending, and is secured to the particle trapping ring 22. The adhesive coating 28 is disposed on the insulating sheet 26 facing the particle trapping ring 22.

Figure 3:
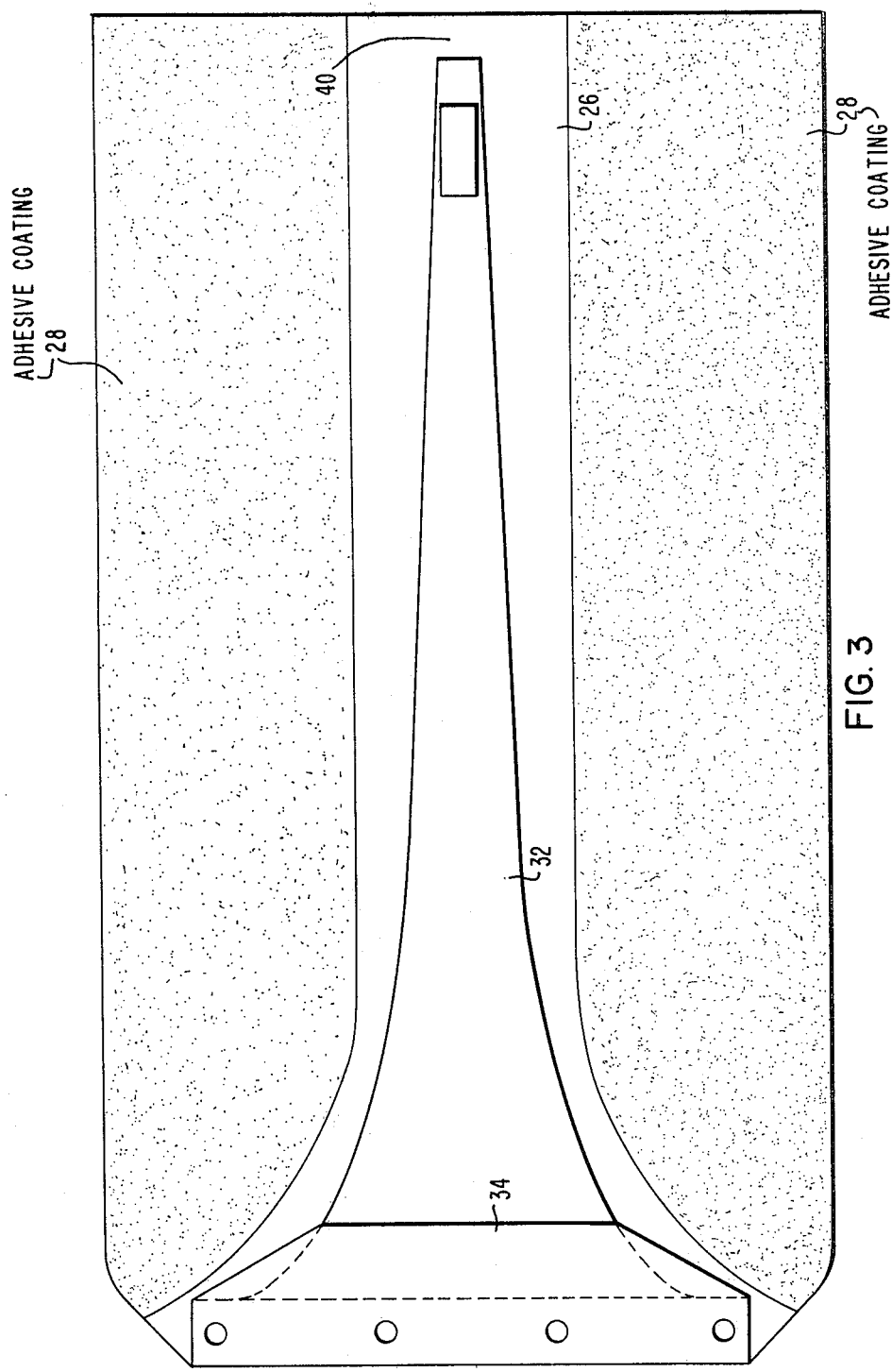
FIG. 3 is a plan view showing the relationship between the springs, insulating sheet and adhesive.

Referring now to FIGS. 2, 3 and 4, the system utilized for connecting the adhesive coated insulating sheet 26 to the ring 22 is illustrated in greater detail. The insulating sheet 26 is disposed on the interior surface 30 of the outer sheath 12, and a generally triangularly-shaped, circumferentially-extending insulating leaf spring 32 is disposed between the insulating sheet 26 and the ring 22. The leaf spring 32 is preformed along the radius of curvature of the outer sheath 12 and is secured to the particle trapping ring 22. The leaf spring 32 contacts the insulating sheet 26 along its circumferentially-extending length and functions to load the insulating sheet 26 to hold it on the interior surface 30 of the outer sheath 12.

A stiffener spring, or preload spring 34 is secured to the particle trapping ring 22 between the ring 22 and the leaf spring 32, with the stiffener spring 34 functioning to preload the leaf spring 32 and the insulating sheet 26 outwardly away from the particle trapping ring 22 and towards the outer sheath 12. Thus, as can be seen, the assembly comprises, as it extends radially outwardly, the particle trapping ring 22, the stiffener spring 34, the leaf spring 32 and the adhesive coated insulating sheet 26 all secured to the particle trapping ring 22 by means such as the screw 36 and nut 38.

For best performance, it is preferable that the insulating sheet 26 be of an abrasion-resistant plastic material such as polyester, and the adhesive coating 28 disposed thereon be a permanently-tacky adhesive material. The leaf spring 32 is preferably made of acetal, and the stiffener spring 34 being made of beryllium-copper. As can be appreciated, these elements can also be made of other comparable materials.

As can be seen in FIG. 3, the adhesive material 28 does not cover the entire surface of the insulating sheet 26, but instead there is a section of the insulating sheet 26 in the longitudinal center portion 40 thereof which does not include this adhesive material 28. This central portion 40 is that area upon which the leaf spring 32 will eventually be disposed. By not placing the adhesive material 28 in this central portion 40, the leaf spring 32 is not stuck to the insulating sheet 26 and can uniformly load the insulating sheet 26 against the outer sheath 12 when installed in the transmission line 10.

Also to be noted is that the stiffener spring 34 does not extend circumferentially a great distance, rather, the stiffener spring 34 is fairly short. This is because the stiffener spring 34 functions only to bias the leaf spring 32 and the insulating sheet 26 outwardly from the ring 22 towards the outer sheath 12. The stiffener spring 34 acts to quickly change the contour of the insulating sheet 26 from the trap radius to the enclosure radius. It accomplishes this function because the stiffener spring 34 itself is preloaded biased radially outwardly.

Reference to FIG. 1 will illustrate that the insulating sheet 26 and the adhesive material 28 disposed thereon extend longitudinally outwardly beyond the longitudinal edges 42, 44 of the particle trapping ring 22. This longitudinal extension provides an advantage and an improved particle trapping system. In general, an electrical shadow or reduced electric field area exists at the longitudinal edges 42, 44 of the ring 22 which tend to stop particle motion before the particles enter the low field region 20 proper. This shadow area may particularly cause a problem if the particle trapping ring 22 is mounted on a moving insulating support 16, such as that illustrated in the figures, since any thermal expansion or contraction of the inner conductor 14 can move both insulating support 16 and ring 22 away from the particles thus exposing these particles to higher electric field levels which may tend to move the particles into sensitive areas of the dielectric system. Because the insulating sheet 26 and the adhesive material 28 disclosed thereon extend outwardly into this shadow area, the particles are trapped on the adhesive coating 28 and are moved with the insulating sheet 26 which moves upon movement of the particle trapping ring 22, and thus these contamination particles are unable to reachieve free motion within the transmission line 10.

In order to prevent the adhesive-coated insulating sheet 26 from contacting the particle trapping ring 22, as for example during shipping and installation, it may be desirable to include a spacer or bumper 46 between the insulating sheet 26 and the ring 22. As illustrated in FIG. 2, the bumper 46 should be of an insulating material such as a polypropylene felt, and should be disposed between and contacting the ring 22 and the leaf spring 32 circumferentially distal from the location where the leaf spring 32 and insulating sheet 26 are secured to the ring 22, i.e. at the location of the screw 36 and nut 38. The bumper 46 may be secured, for example, to the ring 22 by means such as the blind rivet 48 which extends through the opening 50 in the bumper 46. With the inclusion of this bumper 46, the insulating sheet 26 with its adhesive coating 28 cannot come in contact with the particle trapping ring 22 during shipping or installation, and thus the insulating sheet 26 can be loaded against the interior surface 30 of the outer sheath 12 by means of the leaf spring 32 and stiffener spring 34.

One problem which was required to be overcome concerned the connection of the stiffener spring 34, the leaf spring 32 and the insulating sheet 26 to the particle trapping ring 22. On the one hand, there should be no projections extending inwardly from the particle trapping ring 22, for these projections would be highly stressed by the electric fields existing at those locations and could initiate flashover or breakdowns at that point.

On the other hand, the distance between the particle trapping ring 22 and the outer sheath 12 may, for lower voltage ratings, be extremely small (on the order of three-eighths inch or so) and thus the securing means should not extend too far radially outwardly from the particle trapping ring 22 either. These above two requirements were met by the securing system 53 illustrated in greater detail in FIG. 4.

The particle trapping ring 22 has a recessed opening 54 punched or otherwise formed therein, with the recess 56 extending downwardly into the ring 22 a distance substantially equal to the depth of the head 58 of the screw 36. As a result of this punching process, a dimple 60 is formed surrounding the opening 54 and extends radially outwardly from the ring 22. Both the stiffener spring 34 and the leaf spring 32 have openings 62, 64 respectively therein which are of a size larger than the dimple 60, so that the dimple 60 can extend through these openings. The insulating sheet 26, conversely, has an opening 66 therein of substantially the same size as the opening 54 through the ring. Thus, as the securing system 53 is assembled, the insulating sheet opening 66, the leaf spring opening 64, and the stiffener spring opening 62 are all aligned with the ring opening 54, and the screw 36 extends through these aligned openings. A retaining bar 70 having an opening 72 therein of the same size as the ring opening 54 is disposed radially outermost and is aligned with the openings 62, 64, 66 of the stiffener spring 34, leaf spring 32, and insulating sheet 26. The retaining bar 70 may, for example, also be of a material such as beryllium copper. The screw 36 likewise extends through the opening 72 of the retaining bar 70. The nut 38 is then tightened on the screw 36 radially outwardly of the retaining bar 70.

By utilizing such a configuration, with the head 58 of the screw 36 being disposed within the recessed opening 56 in the particle trap ring 22, there exists no sharp edges which can initiate flashover or breakdown. Because the dimple 60 extends through enlarged openings 64, 64 in the stiffener and leaf springs 34, 32, there is required no additional radial distance to accommodate this connection, and the use of the smaller-openings 66, 72 for the insulating sheet 26 and the retaining bar 70 provide for a tight connection of these elements. The entire assemblage then easily fits within the small space required.

Therefore, as can be seen, the transmission line of this invention provides improved means for connecting an adhesive coated insulating sheet to the particle trapping ring to provide a more effective particle trapping system.

We claim as our invention:

1. A gas insulated transmission line comprising:
a cylindrical outer sheath at low electric potential;
an inner conductor disposed within said outer sheath;
an insulating gas disposed within said outer sheath;
an insulating support insulatably supporting said inner conductor within said outer sheath;
a cylindrical, apertured particle trapping ring disposed within, and spaced-apart from said outer sheath;
a circumferentially-extending flexible insulating sheet secured to said particle trapping ring and disposed on the interior surface of said outer sheath, said sheet having an adhesive coating disposed thereon facing said ring;
a circumferentially-extending insulating leaf spring, preformed on the radius of curvature of said outer sheath, secured to said ring and disposed intermediate said insulating sheet and said ring, said leaf spring contacting and loading said insulating sheet to hold said insulating sheet on the interior surface of said outer sheath; and
a stiffener spring secured to said ring intermediate said ring and said leaf spring, said stiffener spring preloading said leaf spring and said insulating sheet outwardly away from said ring and toward said outer sheath.

2. The transmission line according to claim 1 including an insulating bumper disposed between and contacting said ring and said leaf spring circumferentially distal from the location at which said leaf spring and said insulating sheet are secured to said ring.

3. The transmission line according to claim 2 wherein said bumper is made of polypropylene felt.

4. The transmission line according to claim 1 wherein said insulating sheet is made of an abrasion-resistant plastic material.

5. The transmission line according to claim 4 wherein said insulating sheet is made of polyester.

6. The transmission line according to claim 1 wherein said leaf spring is made of acetal.

7. The transmission line according to claim 1 wherein said stiffener spring is made of beryllium-copper.

8. The transmission line according to claim 1 wherein said particle trapping ring is secured to said insulating support and is movable therewith.

9. The transmission line according to claim 1 wherein said insulating sheet extends longitudinally-outwardly beyond said particle trapping ring.

10. The transmission line according to claim 1 wherein said leaf spring is generally-triangularly-shaped.

11. The transmission line according to claim 1 wherein said ring has a recessed opening therethrough with a dimple surrounding said opening extending radially outwardly therefrom;
said stiffener spring and said leaf spring have openings therein larger than said dimple;
said insulating sheet has an opening therein of the same size of said ring opening, said ring opening, said stiffener spring opening, said leaf spring opening, and said insulating sheet opening being aligned with each other; and including
a retaining bar having an opening therein of the same size as said ring opening aligned with said ring, leaf spring, stiffener spring, and insulating sheet openings, said retaining bar being disposed radially outermost; and
securing means extending through said aligned openings securing said retaining bar to said ring.

12. The transmission line according to claim 11 wherein said securing means comprises a screw disposed in said recessed opening and extending through said aligned openings, and a nut tightened on said screw radially outwardly of said retaining bar.

* * * * *